United States Patent [19]
Linkowski et al.

[11] Patent Number: 4,843,572
[45] Date of Patent: Jun. 27, 1989

[54] INKING CONTROL METHOD AND APPARATUS FOR A MAILING MACHINE

[75] Inventors: William J. Linkowski, Poughquag, N.Y.; John J. Stelben, Greenwich, Conn.

[73] Assignee: Pitney Bowes Inc., Stamford, Conn.

[21] Appl. No.: 49,876

[22] Filed: May 14, 1987

[51] Int. Cl.[4] .......... G06F 15/20

[52] U.S. Cl. .......... 364/519; 101/350; 101/351; 364/550

[58] Field of Search .......... 101/148, 327, 350, 351, 101/359; 364/519, 550

[56] References Cited

U.S. PATENT DOCUMENTS 4,266,480 5/1981 Lorenzo .
4,280,180 7/1981 Eckert et al. .
4,639,918 1/1987 Linkowski .
4,644,541 2/1987 Linkowski .

OTHER PUBLICATIONS

Centronics, Model 352, Operator, Installation and Programming Instructions, Jun. 1983, pp. 1-3 and 7-1 to 7-6.

*Primary Examiner*—Parshotam S. Lall
*Assistant Examiner*—Edward R. Cosimano
*Attorney, Agent, or Firm*—Donald P. Walker; David E. Pitchenik; Melvin J. Scolnick

[57] ABSTRACT

An improved mailing machine has a switch for incrementally changing the magnitude of a time interval during which ink is applied to the applicator roller. The magnitude of the time interval for ink application is both stored and displayed. The magnitude of the change in the stored and displayed values is incremented by one unit for each unit of time that the switch is actuated.

34 Claims, 5 Drawing Sheets

INKING CONTROL METHOD AND APPARATUS FOR A MAILING MACHINE

BACKGROUND OF THE INVENTION

This invention generally relates to the field of mailing machines and more particularly to an inking control method and apparatus for a mailing machine.

Commercially available mailing machines generally include letter feeding apparatus for cyclically feeding letters one at a time through the machine and a postage meter. The postage meter is conventionally constructed and arranged to include structure for metering respective postage values, and for printing a postage indicia, including the metered postage value, on each of the letters fed through the machine. As shown in U.S. Pat. Nos. 4,639,918 and 4,644,541, and in U.S. patent application Ser. No. 692,753 for Programmable Indicia Position Delay In A Mailing Machine, filed Jan. 18, 1985 in the name of William J. Linkowski and assigned to the assignee of the present invention, it is known to provide a keyboard activated microcomputer control system for controlling the various functions of a mailing machine, including the function of operating a solenoid to cause ink to be supplied for a maximum time interval of ten seconds, in response to each activation of an ink key. Although not shown in the aforesaid materials, the inking control system may be of the type shown in U.S. Pat. No. 4,266,480, wherein an ink applicator roller is disposed for engagement by the postage indicia printing structure during each printing cycle of operation of the postage meter and a solenoid actuated transfer roller is provided, for intermittent engagement with both the applicator roller and an ink supply roller immersed in an ink reservoir, for transferring ink from the reservoir, via the rollers, to the printing structure. With this arrangement, ink from the ink supply roller is wicked by the solenoid operated transfer roller to the applicator roller, and thus to the printing structure, whenever the transfer roller is urged into engagement with the supply and applicator rollers, whether or not the printing structure is rotated. Thus the time period during which the solenoid is operated corresponds to the time period during which ink is supplied to the applicator roller.

Although the above patents and application disclose the provision of a semi-automatically operated, applicator roller inking control system, they do not disclose the provision of any means for adjusting the time interval during which applicator roller inking occurs to allow for customer or postal service preferences or to compensate for wear and aging of the rollers. However, it is known in the art to utilize one of the DIP switches located as shown in the aforesaid U.S. Pat. Nos. 4,639,918 and 4,644,541 and patent application Ser. No. 692,753, for permitting maintenance personnel to change the applicator roller inking time interval, from one or the other of a minimum of 5 seconds or a maximum of 10 seconds, to allow for customer or postal service preferences regarding the density of printed postage indicia and, if the inking time interval is set to 5 seconds, to allow for maintenance personnel to adjust the time interval to 10 seconds to compensate for roller wear and aging. In this connection it is noted that the DIP switches shown in the aforesaid patents and application are located beneath the control panel of the mailing machine for access by factory trained maintenance personnel rather than customer-users of the mailing machines.

From time to time, users of such mailing machines process a given batch of letters which are made of paper stock which absorbs ink more readily and in larger volumes than the paper stocks from which standard letters are made, with the result that the applicator roller and thus the printing structure is depleted of ink more rapidly than under normal letter processing conditions. Under such circumstances, and assuming the provision of a DIP switch, the DIP switch could be utilized to compensate for the more rapid utilization of ink by removing the control panel and manipulating the switch. However, this is a time consuming maintenance procedure which provides a permanent change in the inking time interval. Aside from these considerations, this procedure assumes that the DIP switch has not already been utilized to set the applicator roller inking time interval to 10 seconds, and also assumes that utilization of the DIP switch will increase the inking time interval to appropriately compensate for the increased ink usage. Accordingly, in general, the machine operator's only recourse is to depress the ink key more often than he would otherwise do so, while the batch of non-standard letters are being processed. In order to alleviate this problem, an apparent solution is to provide an adequate number of accessible DIP switches to the machine at the time of manufacture to permit an operator to incrementally increase the applicator roller inking time interval appropriately to compensate for any increased ink usage which is encountered. However, DIP switches are delicate mechanical components and therefore prone to eventual failure, especially if utilized on a day to day basis. Further, assuming the provision of such DIP switches for changing the inking time interval, they could be improperly utilized to compensate for roller wear and aging beyond the useful life of the applicator roller with the result that the problems mentioned in U.S. Pat. No. 4,266,480 may be encountered, including for example ink sludge being accumulated by the printing structure.

Accordingly:

An object of the invention is to provide an inking control method and apparatus for of a mailing machine;

Another object is to provide means for temporarily changing the time interval during which ink is applied to the ink applicator means of a mailing machine;

Another object is to provide a microcomputer controlled inking system for a mailing machine; and Another object is to provide means for selectively changing the time interval during which ink is applied to the applicator roller of a mailing machine.

SUMMARY OF THE INVENTION

In a mailing machine including. postage indicia printing means, means for applying ink to the printing means, a source of supply of ink, means for transferring ink from the source of supply to the ink applying means and means for controlling said ink transferring means to transfer ink during a predetermined time interval, there is provided an improvement in the controlling means. The improvement comprises means for displaying said predetermined time interval, and means for temporarily changing said predetermined time interval to a new time interval.

BRIEF DESCRIPTION OF THE DRAWINGS

As shown in the drawings wherein like reference numerals designate like or corresponding parts throughout the several views.

DESCRIPTION OF THE PREFERRED EMBODIMENT

Figure 1:
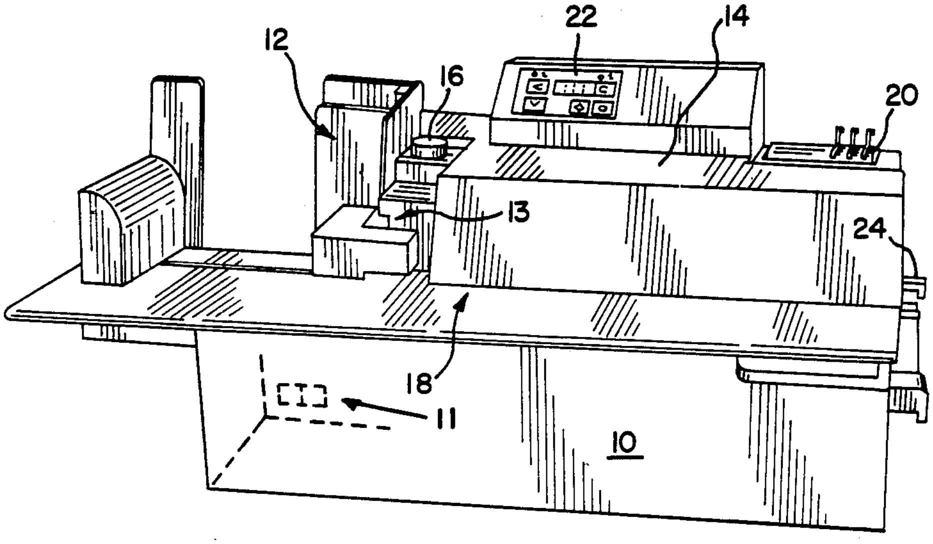
FIG. 1 is an illustration of a specific embodiment of a mailing machine in accordance with the invention.

FIG. 1 is an illustration of a specific embodiment of a mailing machine 10 utilizing the invention. The mailing machine 10 is conventionally constructed and arranged to be energized from a local source of power (not shown) via an on-off power switch 11 and comprises numerous subsystems hereinafter described, including a letter feeder bin 12 for stacking letters, and including an automatic letter feeder 13 which feeds the letters from the bin 12 to a conventional belt and roller transport mechanism (not shown) which is contained within a housing 14. The letter feeder 13 and transport mechanism are conventionally driven by an electric drive motor (not shown) which is also contained within the housing 10. An adjustment knob 16 permits adjustment of the feeder 13 to provide for a range of letter thicknesses. The transport mechanism includes a transport belt (not shown) for moving each letter along a path of travel defined by a deck 18, through conventional sealing structure to a postage meter 20 which, when normally operated, activates a cyclically rotatable drum 600 (FIG. 3) which includes printing structure 602 for printing a postage indicia on each letter.

In addition, the machine includes conventional apparatus 604 for inking the printing structure 602, including a source of ink, such as a receptacle 606 containing a supply of ink 608. The inking apparatus 604 also includes an ink roller 610 which is conventionally rotatably connected to the receptacle 606, as by means of a shaft 612, for immersion in the ink 608. In addition the inking apparatus 604 includes an ink applicator roller 613 which is rotatably mounted on a shaft 614 for disposition in engagement with the printing structure. Further, the inking apparatus 604 includes an ink transfer roller 615, which is located between the inking roller 610 and applicator roller 613 and rotatably connected to an arm 616 which is conventionally pivotably attached to framework 617. In addition, the inking apparatus 604 includes a shaft 618 and spring 620. The shaft 618 is suitably adapted to be movably connected to the arm 616, and to the framework 617 by mean of the spring 620 which normally holds the transfer roller 615 out of engagement with the applicator roller 613 and ink roller 610. In addition, the inking structure includes an ink solenoid 625 which, when operated, urges the transfer roller 615 against the force of the spring 620 and into engagement with the applicator roller 613 and inking roller 610, for transferring ink 608 from the receptacle 606, via the rollers 610, 615 and 613 to the printing structure 602.

A control panel 22, including control keys and a visual display, provides for operator control of the mailing machine functions. A meter select lever 24 permits the meter to be disabled so that the mailing machine only seals letters without printing a postage indicia and further permits the meter to be detached from the mailing machine. In the preferred embodiment, the postage meter is mechanical, but may also be electronic or partially electronic. A photo-sensor (not shown) located within the housing is utilized to detect the flow of letters through the transport mechanism.

Figure 2:
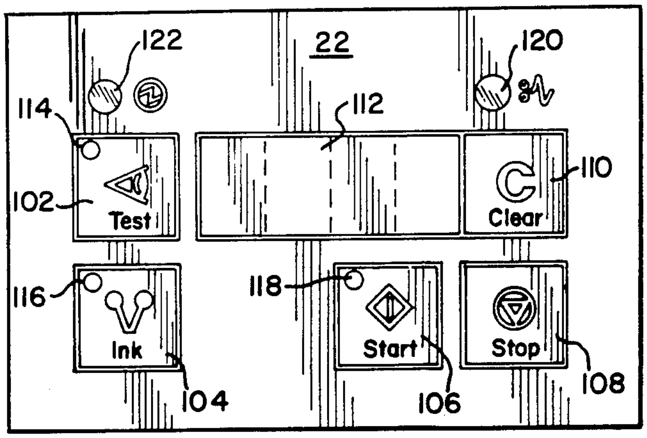
FIG. 2 is an illustration of a specific embodiment of a mailing machine control panel as shown in FIG. 1.

Referring now to FIG. 2, there is shown a mailing machine control panel 22 for providing operator control of mailing machine functions. The control panel 22 includes a test mode key 102 for activating a test mode, an ink key 104 for activating the ink solenoid to provide ink to the applicator roller 613 and thus to the postage meter printing structure 602, a start key 106 for starting the mailing machine, a stop key 108 for stopping the machine, and a clear key 110 for clearing a display 112. The display 112 is preferably a four digit light emitting diode (LED) display for displaying a piece count and diagnostic information. The test, ink and start keys each have an indicator light (e.g., an LED in the preferred embodiment), indicated by reference numerals 114, 116 and 118 respectively, to indicate to the operator when the associated key has been activated. A jam indicator 120 indicates when letters are jammed in the machine, and a power on indicator 122 indicates when power is applied to the mailing machine via the power switch 11. In addition, a bank of switches (not shown) located under the control panel permit adjustment of the location, relative to the leading edge of the envelope, of the postage indicia printed by the postage meter.

The mailing machine control panel 22 performs a dual function of providing control by an operator, in a normal operating mode of mailing machine functions and, in a test mode, of controlling diagnostic test procedures (i.e., the control panel keys serve as code entry keys for initiating tests). When an operator desires to test the mailing machine, the test key is depressed thereby switching the machine into a test mode. In the test mode the operator enters a password sequence (e.g., depressing the ink, stop, clear and ink keys in sequence) using the keys of the control panel thereby starting the test procedure. After entry of a valid password the display lights up with a sign-on message (e.g. HELP in the preferred embodiment) after which the operator can enter a test code using the various keys of the control panel to initiate a test. By this procedure the operator can start and monitor electrical or electromechanical devices of the mailing machine via the control panel using the LED display for output of information. To stop a test in progress the stop key is depressed which shuts down the test performed and displays "EN00" on the visual display, which indicates that the system is ready to initiate another diagnostic test. To exit from the diagnostic test mode, the test key is depressed which disables the test indicator light and switches the system back to the normal mode of operation.

Figure 3:
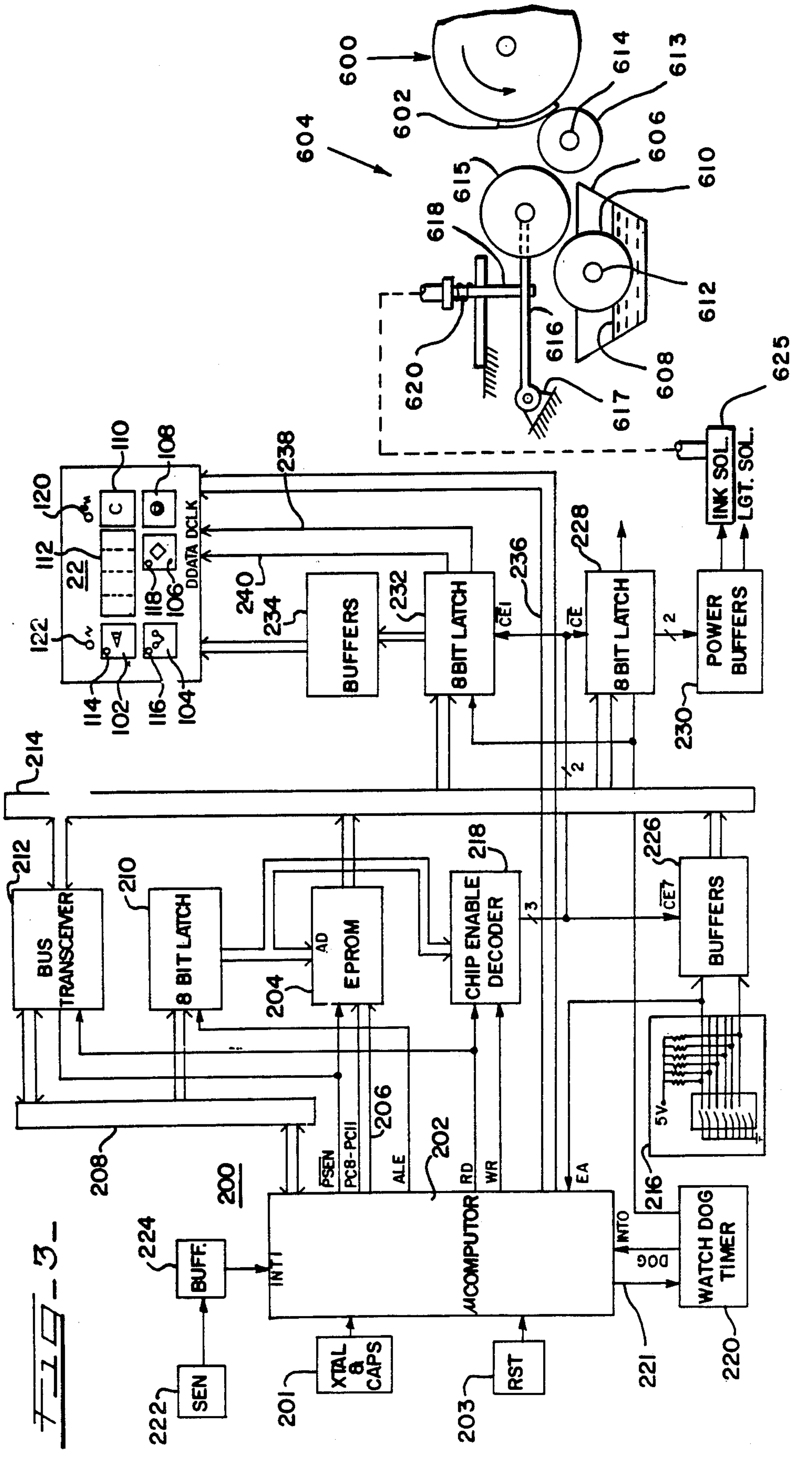
FIG. 3 is a detail block diagram of a specific embodiment of electronic control circuitry for a mailing machine in accordance with the invention.

Referring to FIG. 3, there is shown a detailed block diagram of a specific embodiment of control circuitry 200 for a mailing machine according to the invention. A microcomputer 202 (e.g., an Intel 8031) provides the central processing capability for the system with its internal oscillator regulated by a crystal and capacitor network 201 and power-up reset provided by a capacitor 203. An electrically programmed read only memory (EPROM) 204 provides field programmable program memory for the microcomputer 202. This programmable device (EPROM) 204 is addressed by the microcomputer 202 via an 8-bit address coupled through a bus 208 to an 8-bit latch 210 and via a 4 bit bus 206 from the upper byte of the address port of the microcomputer 202, as shown. The EPROM 204 is enabled by the program store enable signal (PSEN) and the latch 210 is strobed by the address latch enable strobe (ALE). The addressed data from the EPROM 204 is coupled upon being strobed by the PSEN signal to a data bus 214. A bidirectional bus transceiver 212 provides buffering for passing data between the bus 208 and the data bus 214, as shown, and is controlled by the PSEN signal and a read signal (RD) from the microcomputer 202. A chip enable decoder 218 is provided to generate enable signals to control several peripheral latches 228, 232 and buffer circuits 226, and is controlled by the microcomputer 202 via the RD signal, and a write strobe (WR) as well as by four secondary address lines coupled from the latch 210, as shown. A conventional watchdog timer 220 (e.g. a monostable multivibrator) retriggered periodically (e.g. every 150 ms in the preferred embodiment) by the microcomputer 202 via a data line 221 is provided to generate watchdog signals which are coupled to the microcomputer external interrupt zero input (INTO), as well as to several latch circuits 228, 232, as shown. Thus, if the microcomputer 202 stops or hangs up, the watchdog timer interrupts the processor to allow a restart and inhibits the display and power latches 228, 232.

A letter sensor 222 (e.g. a photo-sensor) is provided for sensing the flow of letters through the mailing machine by generating an interrupt signal in response to detection of the leading edge of a document. This interrupt signal is coupled through a buffer 224 to the microcomputer external interrupt one input (INTl), as shown. In response to this interrupt, the microcomputer 202 waits for a fixed delay time (e.g. 40 ms in the preferred embodiment) during which time it reads data from a bank of data switches 216 which determines a programmable delay. This delay is added to the fixed delay and after the total delay period the microcomputer 202 energizes a letter solenoid (not shown). The letter solenoid activates the postage meter 20 causing the postage indicia to be printed. The photo-sensor signal from the trailing edge of the documents is used by the microcomputer 202 to prepare for the next leading edge. If no trailing edge occurs for 400 ms, the processor generates a "jam" signal which activates the jam indicator 120. In addition to the letter solenoid, the microcomputer 202 controls the ink solenoid 625 as hereinbefore discussed to supply ink to the postage indicia printing structure 602 for either 5 or 10 seconds in response to activation of the ink key 104. The signals for controlling these solenoids are coupled from the microcomputer 202 through the bus 208, bus transceiver 212 and data bus 214 to a latch 228 and then through power buffers 230, as shown. In addition, some of the data coupled to the latch 228 is utilized to control the motor (not shown) which drives the document feeder and transport mechanism.

The switch bank 216 comprises a set of four switches (e.g. a DIP switch package in the preferred embodiment) which are coupled through a buffer 226 to the data bus 214, as shown, thereby providing binary coded switch data to the microcomputer 202 via the buses 214 and 208 and bus transceiver 212. This data is utilized by the microcomputer 202 to determine the amount of time delay between sensing the leading edge of a document fed by the transport mechanism through the mailing machine and operating the postage meter for printing the postage indicia on the document. Thus these selection switches permit an operator to adjust the delay and therefore control the indicia positioning. Since there are four switches configured for binary coding, there are a total of sixteen delay values selectable, with each value representing approximately one eighth of an inch shift (i.e. 2.5 ms delay) in the position of the printed indicia. In addition, a single line from a fifth switch in the bank of switches 216 is coupled to the EA input of the microcomputer 202 to provide the option of use of either an internal or an external read only memory. Further, a sixth DIP switch in the bank of switches 216 is coupled through the buffer 226 to the data bus 214 to provide binary coded switch data to the microcomputer 202 via the buses 214 and 208 and bus transceiver 212 to the latch 228 and through the power buffers 230, for utilization by the microcomputer 202 to determine the time interval during which the inking solenoid 625 is operated and thus the time interval during which the applicator roller is inked by the transfer roller.

The microcomputer 202 communicates with the control panel 22 via two paths: (1) a 6-bit data bus 236 and (2) a path through the latch 232 and buffer 234, as shown. The data bus 236 couples to a 3×3 keyboard matrix providing for input to the microcomputer 202 from a total of nine switches of which only six are presently used as described hereinbefore. In addition, four bits of data are coupled from the bus 214 through the latch 232 and buffers 234 to activate the test indicator light 114, the ink indicator light 116, the start indicator light 118, and the jam flow indicator light 120. Finally, the data DDATA on line 240 for display on the four-digit LED display 112 is serially clocked into a set of display registers in the display by a DCLK signal on line 238.

Figure 4:
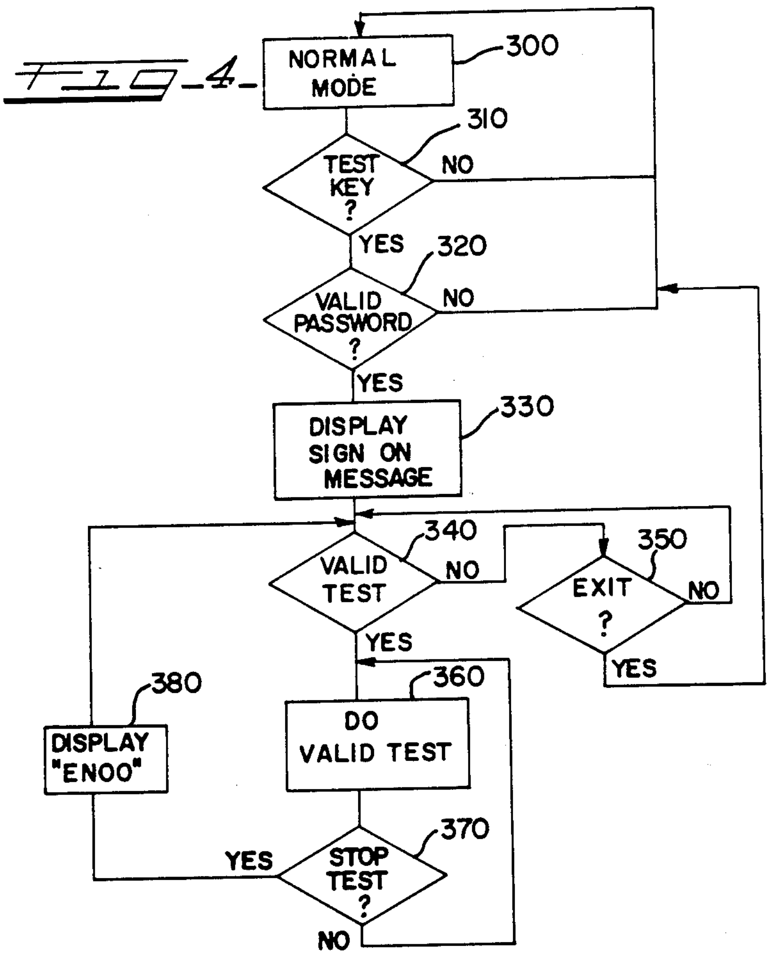
FIG. 4 is a flow diagram of a specific diagnostic test initiation sequence.
Figure 5A:
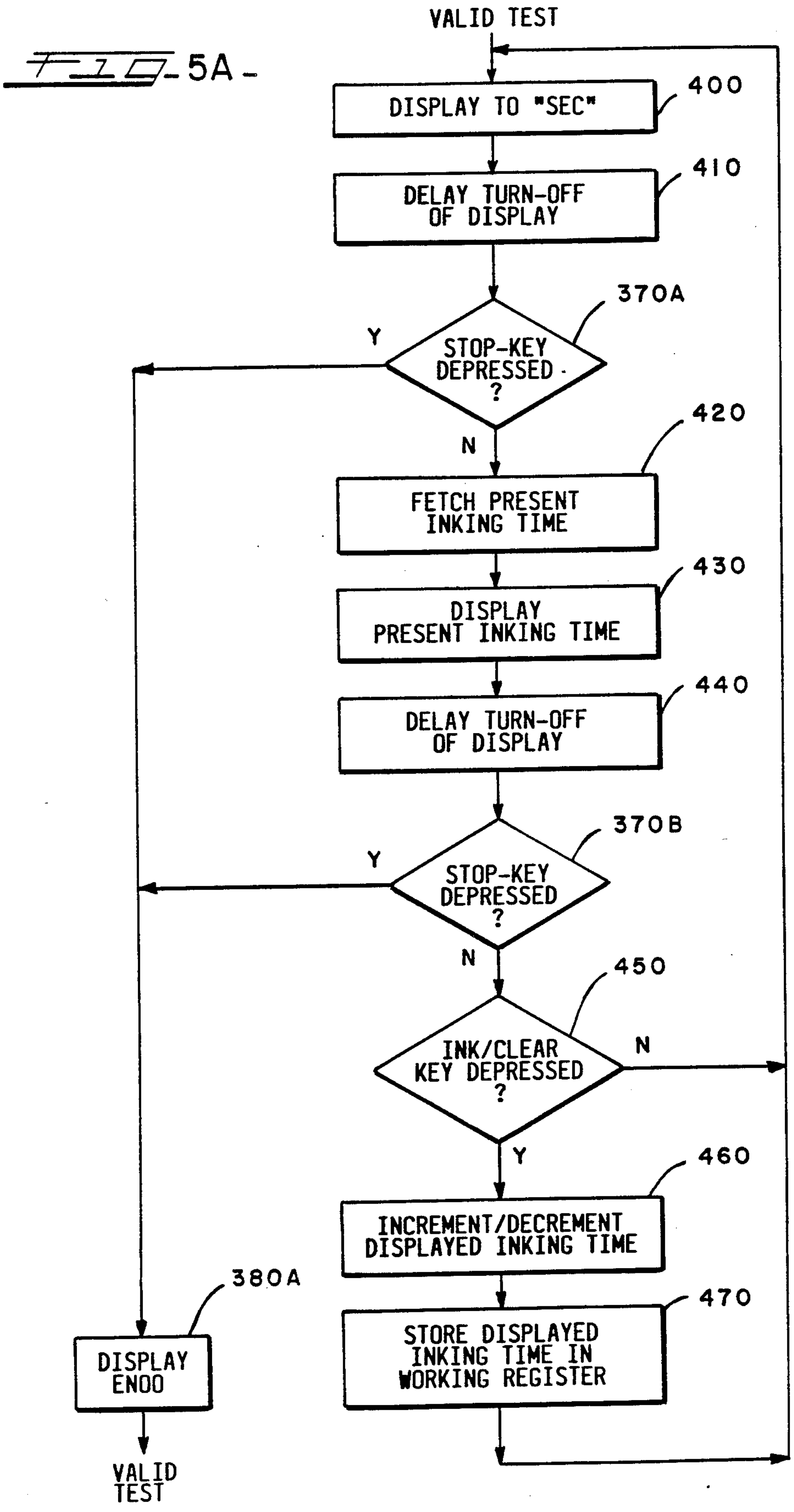
FIG. 5A is a flow diagram of the preferred embodiment of the inking time interval diagnostic test program according to the invention.
Figure 5B:
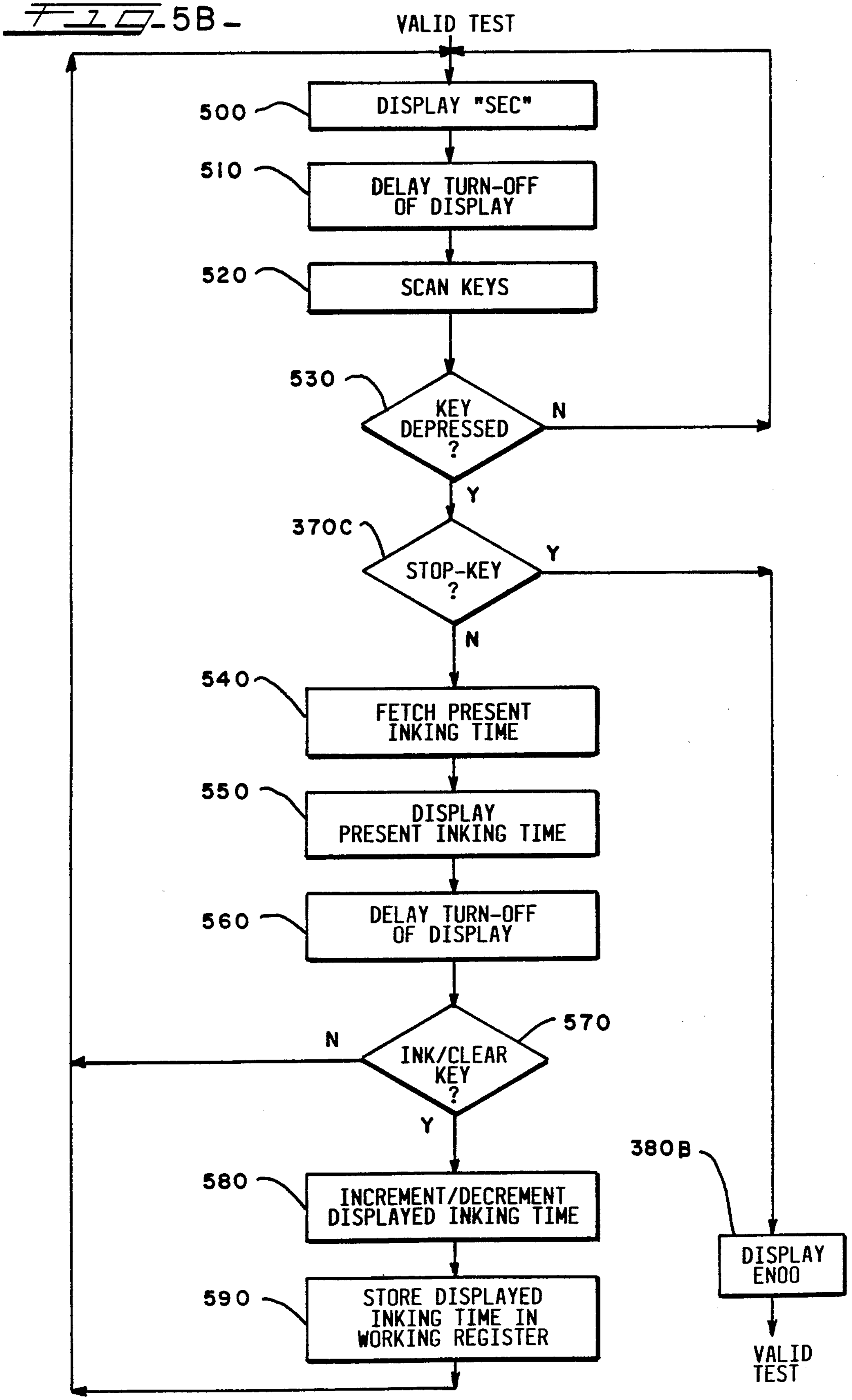
FIG. 5B is a flow diagram of another embodiment of an inking time interval diagnostic test program.

FIG. 4 is an illustration of a flow diagram of a specific diagnostic test initiation sequence. The test initiation sequence begins with software operating in a normal mode as indicated at 300. At block 310 a test is performed to determine whether the test key has been depressed. If not, the system returns to the normal mode and continues in normal operation. If the test key has been depressed, the system waits for entry of a password and then a logic test is performed to determine whether invalid password has been entered as illustrated at 320. If a invalid password has been entered, the system will return to a normal mode of operation, as shown. If the valid password has been entered a sign-on message will be displayed on the LED display on the control panel, as indicated at block 330. The system then waits for entry of a test selection code after which a "valid code" logic test will be performed to determine if a proper test code has been entered as illustrated at 340. If the proper test code has not been entered program control passes to block 350 to determine whether the test key has been depressed, which results in exit from the test mode and return to the normal mode. If the test key has not been depressed then the system will return to block 340 to continue to monitor for a valid test code. If a valid test code has been entered the system proceeds to perform the test according to the test code entered as indicated at block 360 and monitors the stop key to determine if the test is to be stopped as indicated at block 370 (FIGS. 5A and 5B are flow diagrams of two of such tests). If at block 370 the test is not to be stopped the system will return control to block 360, as shown. If the stop button has been depressed the test will be stopped and the display will exhibit a stopped test indicator as shown at block 380 (e.g. "EN00" in the preferred embodiment). Program control then passes back to block 340 permitting exit from the test mode by depressing the test key or permitting another test to be performed by the entry of a valid test code.

There are numerous tests which can be implemented with the disclosed system. Six of such tests are disclosed in U.S. Pat. Nos. 4,639,918 and 4,644,541 and in U.S. application Ser. No. 692,753 for a Programmable Indicia Position Delay in a Mailing Machine, filed Jan. 18, 1985 in the name of William J. Linkowski and assigned to the assignee of the present invention.

According to the invention, in the test mode of operation one or the other of the processes shown in the flow charts of FIGS. 5A and 5B may be implemented, in order to change the applicator inking time interval from any given time interval to any other time interval, preferably, in one-second increments within the range of from 5 to 20 seconds.

According to the invention, an inking time interval test is initiated by entering the diagnostic test mode and executing the valid key entry for the processor. For example, upon depressing the clear key twice, step 340 (FIG. 4), when the microcomputer control system is in the test mode of operation, the program preferably implements the processing steps shown in FIG. 5A. As shown in FIG. 5A, the program initially implements the step 400 of causing the display to be set to exhibit a start test indicator, for example "SEC" as shown at step 400, followed by implementation of the step 410 of delaying extinguishment of the test indicator for a predetermined time period, preferably 250 milliseconds, to permit the operator to observe the displayed indicator. Thereafter the program implements the step 370A of determining whether or not the stop key is depressed. Assuming that the stop key is depressed, step 370A, the program implements the step 380A of causing the display to exhibit the end of test indicator "EN00" followed by processing being returned to step 340 (FIG. 4). Assuming however that the stop key, step 370A (FIG. 5A) has not been depressed, step 370A, then, the program implements the step 420 of fetching stored data from the working memory which is representative of the presently stored, predetermined inking time interval, followed by the step 430 of causing the display to exhibit the presently stored, predetermined, time interval, for example, the numerals "5" or "10" corresponding to the 5 or 10 second design levels for which the microcomputer is normally programmed by means of the appropriate DIP switch. Thereafter the program implements the step 440 delaying extinguishment of the displayed inking time interval for a predetermined period, for example 750 milliseconds, to permit the operator to observe the display. Thereafter the program executes the step of determining whether or not the stop key has been depressed step 370B. Assuming that the stop key has been depressed, step 370B, then the program implements the step 380A of causing the display to exhibit the end of test indicator "EN00", followed by processing being returned to step 400. Assuming however that the stop key has not been depressed, step 370B, then the program implements the step 450 of determining whether or not the ink or clear keys are being depressed. Assuming that neither of these keys is depressed, then the program returns processing to step 400. Assuming however that either the ink or clear key is being depressed, then, for each one-second time period that the ink or clear key is depressed, the program causes the displayed present inking time interval to be changed by a predetermined amount, preferably one second, step 460, followed by implementation of the step 470 of causing the displayed (now changed) time interval to be stored in working memory, whereby the present inking time interval stored in the working memory (and fetched in the course of implementation of step 420) is changed to a new time interval. More particularly, when the ink key is depressed, the present inking time interval as stored in the working memory and as shown in the display are both incremented by successive one-second time periods, until the key is released or until the maximum time interval of 20 seconds is displayed and stored. On the other hand, when the clear key is depressed, the present time interval as displayed and as stored in the working memory are both decremented by successive one-second time periods until the key is released or until the predetermined minimum time interval of 5 or 10 seconds, as the case may be, is displayed and stored. Of course, without departing from the spirit and scope of the invention, programming may be changed to cause step 460 (FIG. 5A) to be implemented each time the ink or clear key, as the case may be, is momentarily depressed, whereby the inking time interval would be incremented or decremented by the aforesaid predetermined period, say one second, with each depression of the respective ink or clear keys.

In any event, after execution of step 470 (FIG. 5A) the program returns processing to step 400. Thus, the program shown in FIG. 5A continuously loops through the steps shown therein until the operator depresses the stop key, steps 370A or 370B.

In the preferred embodiment, the program includes conventional means for preventing the inking time interval from being decremented to a time interval of less than 5 seconds or incremented to a time interval of more than 20 seconds, due to experience having shown that these minimum and maximum time intervals are realistic limits in view of the operating characteristics of most mailing machines. In an alternate embodiment of the invention, in the test mode of operation, the processing shown in FIG. 5B may be implemented in order to change the inking time interval from any given time interval to any other given time interval, preferably within the time interval range above discussed.

In the alternate embodiment of the invention, the inking time interval test is initiated, as previously discussed, by depressing the ink key, step 340 (FIG. 4), when the microcomputer control system is in the test mode of operation, whereupon the program implements the processing steps shown in FIG. 5B. As shown in FIG. 5B, the program initially implements the step 500 of causing the display to be set to exhibit a start test indicator, for example "SEC", followed by implementation of the step 510 of delaying extinguishment of the test indicator for a predetermined time period, preferably 250 milliseconds, to permit the operator to observe the displayed indicator. Thereafter, the program implements the step 520 of scanning the keys of the control panel, followed by implementation of the step 530 of determining whether or not any key is depressed. Assuming a key is not depressed, step 530, then processing is returned to step 500. Assuming however that a key is depressed, the program then implements the step 370C of determining whether or not it is the stop key that is depressed. Assuming the stop key is depressed, then the program implements the step 380B of causing an end of test indicator to be displayed, for example "EN00", followed by processing being returned to step 340 (FIG. 4). Assuming however that the stop key, step 370C (FIG. 5B) is not the key that is depressed, then the program implements the successive steps of fetching the present inking time interval from the working memory, step 540, displaying the present inking time interval, step 550, and delaying extinguishment of the displayed time interval for a predetermined time period, preferably 750 milliseconds, step 560. Thereafter, the program implements the step 570 of determining whether or not it is the ink or clear key that is depressed. Assuming neither of these keys is depressed, then processing is returned to step 500, whereas if the ink or clear key is depressed, step 570, then the steps of incrementing or decrementing the displayed time interval 580, depending upon which of the ink or clear keys is depressed, followed by storing the displayed inking time interval in the working memory step 590, are implemented by the program in the same manner as steps 460 and 470 of FIG. 5A are implemented as hereinbefore discussed in detail. Accordingly, the remarks made in connection with steps 460 and 470 of FIG. 5A apply with equal force to the program steps 580 and 590 of FIG. 5B. After implementation of step 590, programming is returned to step 500, and, processing loops through the program steps of FIG. 5B until the stop key, step 370C, is found to be depressed.

With respect to either of the aforesaid embodiments of the invention, after adjusting the present inking time interval in the test mode, the test mode is exited as hereinbefore discussed and the batch of letters for which the time interval was adjusted may be processed. Thereafter, the operator may reenter the test mode and implement the processing discussed above to reduce the present inking time interval to its design or default level. However, it is preferred that the present inking time interval, as adjusted by means of the aforesaid procedure, be stored in a working register of the microcomputer and be deleted from the working register when the power from the local source of supply to the mailing machine fails or is disconnected, for example, by switching the power switch 11 (FIG. 1) to its off position. As a result, when the machine power is restored, for example by switching the power switch 11 to its on position, the present inking time interval stored in the working memory will be the design or default time interval of either 5 or 10 seconds, depending upon whether or not the sixth DIP switch has been utilized. Accordingly, after printing the batch of letters for which the present inking time interval was increased, the mailing machine power switch may be toggled to turn the power off and then on again to change the new inking time interval to the design or default time interval, rather than reenter the test mode of operation and implement the aforesaid processing steps to achieve the same result.

In accordance with the objects of the invention, in either of the aforesaid embodiments the applicator roller inking time interval may be temporarily changed from a predetermined, design time interval to a selected new inking time interval, to accommodate the needs of customer-users of mailing machines to compensate for changing ink usage demands due to utilizing different letter paper stock.

The specific embodiments of the method and apparatus for controlling and changing the time interval during which ink is applied to the printing structure of a mailing machine has been described for the purposes of illustrating the manner in which the invention may be made and used. It should be understood that implementation of other variations and modifications of the invention in its various aspects will be apparent to those skilled in the art, and that the invention is not limited by the specific embodiments described. It is therefore understood that the following claims cover the subject matter set forth therein and any equivalents of the invention that fall within the true spirit and scope of the invention.

What is claimed is:

1. In a mailing machine including postage indicia printing means, means for applying ink to the printing means, a supply of ink, means for transferring ink from the supply to the ink applying means and means for controlling the ink transferring means to transfer ink during a time interval, the improvement wherein the controlling mean comprises:

a. means for displaying the magnitude of said time interval; and b. means for changing the magnitude of said time interval from a first predetermined value to a second predetermined value.

2. The improvement according to claim 1, wherein said controlling means comprises means for storing the magnitude of said time interval in working memory, said changing means comprising means for changing the displayed magnitude of the time interval from said first predetermined value to said second predetermined value and means for changing said stored magnitude of the time interval from said first predetermined value to said second predetermined value.

3. The improvement according to claim 1, wherein said controlling means comprises means for storing said first predetermined value, said changing means comprising means for changing the displayed magnitude of the time interval from said first predetermined value to said second predetermined value and means for replacing said stored first predetermined value with said second predetermined value.

4. The improvement according to claim 1, wherein said changing means comprises means for selectively incrementing the magnitude of said displayed time interval by a predetermined amount.

5. The improvement according to claim 1, wherein said changing means comprises means for selectively decrementing the magnitude of said displayed time interval by a predetermined amount.

6. The improvement according to claim 1, wherein said controlling means comprises a microcomputer and a keyboard for activating the microcomputer, said keyboard comprising first and second keys, said first key being operable for causing said controlling means for activate said microcomputer to operate in a test mode of operation, and said changing means comprising means for programming said microcomputer to implement processing steps in response to the operation of said second key when said microcomputer is operating in said test mode of operation.

7. The improvement according to claim 6, wherein said second key is operable for causing implementation of the steps of changing the magnitude of the displayed time interval from a first predetermined value to a second predetermined value and storing said second predetermined value in working memory of the microcomputer.

8. The improvement according to claim 1, wherein said controlling means comprises a keyboard having a plurality of keys, said changing means comprising a first one of said keys operable for causing said controlling means to activate a test mode of operation thereof and a second one of said keys operable for causing said changing means to change the magnitude of the displayed time interval from a first predetermined value to a second predetermined value in said test mode.

9. The improvement according to claim 8, wherein said changing means comprises means for causing said displayed second predetermined value to be stored in working memory.

10. The improvement according to claim 8, further comprising power switching means operable for deenergizing changing energizing said machine, and said changing means comprising means for changing said first predetermined value to said second predetermined value in response to operation of said power switching means.

11. The improvement according to claim 1, further comprising means for delaying extinguishment of the displayed magnitude of the time interval for a predetermined time period.

12. In a mailing machine having a cycle of operation and including postage indicia printing means, means for applying ink to the printing means during each cycle, a supply of ink, means for transferring ink from the supply to the ink applying means and means for causing the transferring means to transfer ink to the ink applying means during a time interval, and wherein said mailing machine has a test mode of operation, the improvement wherein said mailing machine further comprises:

a. means for displaying the magnitude of said time interval; and
b. means for changing the magnitude of said time interval from a first predetermined value to a second predetermined value when said mailing machine is in the test mode of operation.

13. The improvement according to claim 12, wherein said changing means comprises means for selectively increasing the magnitude of said displayed time interval by a predetermined amount.

14. The improvement according to claim 12, wherein said changing means comprises means for selectively decreasing the magnitude of said displayed time interval by a predetermined amount.

15. The improvement according to claim 12, further comprising means for exiting said test mode of operation after changing the magnitude of said time interval, whereby said means for causing the transferring means to transfer ink to the ink applying means during the time interval causes said transferring means to transfer ink for a time duration dependent on the magnitude of said time interval.

16. The improvement according to claim 12, wherein said changing means comprises means for deenergizing and energizing said mailing machine and means for causing the magnitude of said time interval to be changed from said second predetermined value to said first predetermined value when said mailing machine is deenergized and then energized.

17. The improvement according to claim 12, further comprising means for delaying extinguishment of the displayed magnitude of the time interval for a predetermined time period.

18. In a mailing machine including postage indicia printing means, means for applying ink to the printing means, a supply of ink, and means for transferring ink from the supply to the ink applying means, a method of controlling the ink transferring means to transfer ink during a time interval, the method comprising the following steps:

a. storing a first predetermined value corresponding to the magnitude of said time interval;
b. displaying said first predetermined value;
c. changing the displayed first predetermined value to a second predetermined value; and
d. changing the stored first predetermined value to said second predetermined value.

19. The method according to claim 18, wherein step c comprises the step of incrementing said first predetermined value by a predetermined amount.

20. The method according to claim 18, wherein step c comprises the step of decrementing said first predetermined value by a predetermined amount.

21. The method according to claim 18, further comprising the steps of operating a first key causing said mailing machine to operate in a test mode of operation, and when in said test mode operating a second key for implementing step b and operating a third key for implementing steps c and d.

22. The method according to claim 18, further comprising the step of selectively stopping implementation of the method.

23. The method according to claim 18, wherein step c comprises the step of changing the displayed magnitude of the time interval by one-second increments within a time interval range of a minimum of five seconds and maximum of twenty seconds.

24. The method according to claim 18, wherein step b comprises the step of delaying extinguishment of the displayed magnitude of the time interval for a predetermined time period.

25. The method according to claim 18, further comprising the steps of causing said mailing machine to operate in a test mode of operation and then sequentially implementing steps b, c and d.

26. The method according to claim 25, further comprising the steps of exiting the test mode of operation and selectively operating said mailing machine to transfer ink to said applying means for a time interval having a magnitude equal to said second predetermined value.

27. The method according to claim 18, further comprising the step of changing said second predetermined value to said first predetermined value.

28. The method according to claim 27, wherein the step of changing comprises the step of deenergizing the mailing machine.

29. A machine comprising printing means, means for applying ink to the printing means, a supply of ink, means for transferring ink from the supply to the ink applying means, means for storing a value representing the magnitude of a time interval, and means for controlling the ink transferring means to transfer ink during a time interval having a magnitude equal to said stored value, wherein the controlling means comprises an actuatable switch for incrementally changing said stored value, the magnitude of the change in said stored value being dependent on a characteristic of the actuation of said switch.

30. The improvement according to claim 29, wherein said characteristic is the duration of the acutation of said switch.

31. The improvement according to claim 30, wherein the magnitude of the change in said stored value is incremented by one unit of time for each unit of time that said switch is acutated.

32. A method of operating a machine comprising painting means, means for applying ink to the printing means, a supply of ink, means for transferring ink from the supply to the ink applying means, means for storing a value representing the magnitude of a time interval, and means for controlling the ink transferring means to transfer ink during a time interval having a magnitude equal to said stored value, said controlling means comprising an actuatable switch, said method comprising the step of incrementally changing said stored value, the magnitude of the change in said stored value being dependent on a characteristic of the actuation of said switch.

33. The method according to claim 32, wherein said characteristic is the duration of the acuation of said switch.

34. The method according to claim 33, wherein the magnitude of the change in said stored value is incremented by one unit of time for each unit of time that said switch is actuated.

* * * * *